Sept. 21, 1954  F. A. SCHINDLER  2,689,351
METHOD OF FORMING STUMP SOCKETS
Filed Oct. 6, 1951
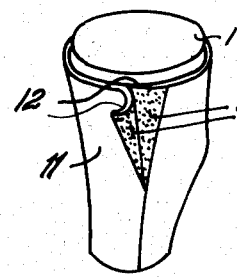
Fig.1
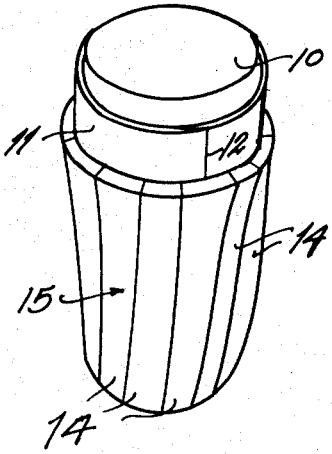
Fig.2
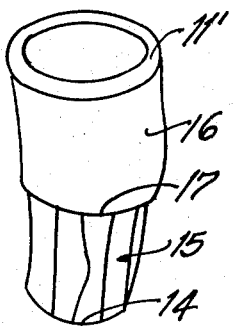
Fig.4
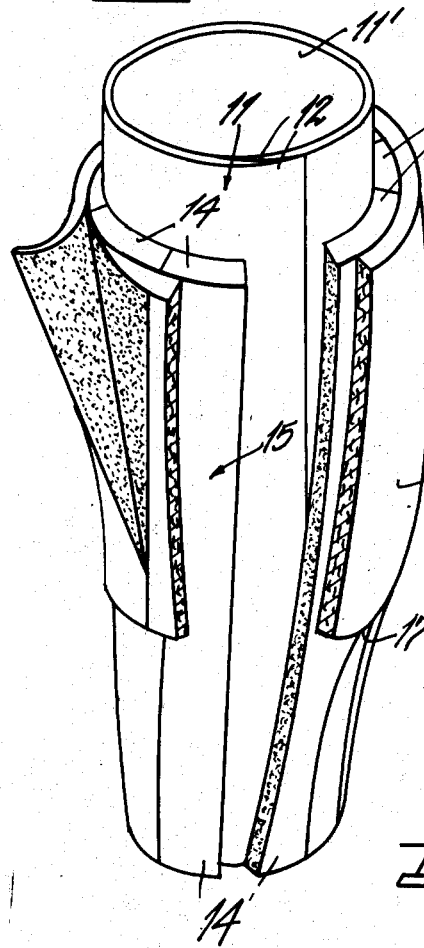
Fig.3
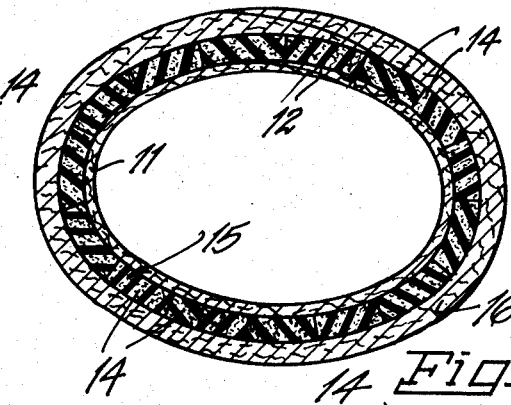
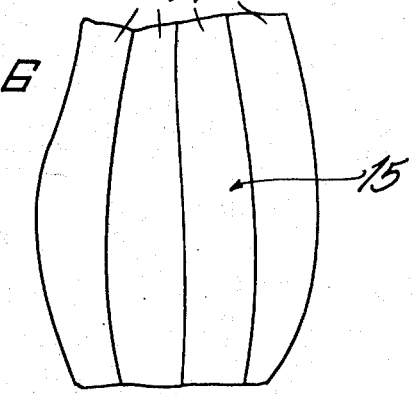
Fig.5
Fig.6
Fig.7
INVENTOR.
Frank A. Schindler
BY
Glenn L. Fish
ATTORNEY

Patented Sept. 21, 1954

2,689,351

UNITED STATES PATENT OFFICE 2,689,351

METHOD OF FORMING STUMP SOCKETS

Frank A. Schindler, Spokane, Wash.

Application October 6, 1951, Serial No. 250,132

4 Claims. (Cl. 3—17)

My present invention is an improved stump socket for the stump of amputated limbs and the method of making same.

Stump sockets have been known and used for many years, but have not been entirely satisfactory since they have failed to provide a socket which eliminates all unnecessary pressures on the prominent boney structure of the stump. The prominent boney structure is usually tender and much discomfort is in store for the wearer when the pressure is too great. To overcome this disadvantage, it is necessary to build each socket to fit the individual stump being fitted.

I have discovered a method of accurately producing a stump socket which eliminates all unnecessary pressure on the prominent boney structure and provides a comfortable and well fitting socket for attaching a false limb to the stump.

Briefly stated, my invention comprises a stump socket having a resilient cushioning pad shaped to fit the stump loosely over the prominent boney structures and more tightly over the shallow or recessed fleshy areas and the novel method of forming the socket.

In the accompanying drawings, forming a part of this specification, and in which like numerals are employed to designate like parts, Figure 1 is a prespective view of a duplicate form of a stump and having a cover applied thereto and partially secured, Figure 2 is a perspective view of the form after the resilient cushion strips have been applied, Figure 3 is a perspective view of a socket, upon an enlarged scale, showing the outer cover applied and partially secured and with portions cut away for illustration purposes, Figure 4 is a perspective view of a finished socket, Figure 5 is a transverse cross section taken through a finished socket, Figure 6 is a fragmentary side elevation showing a socket with the outer covering removed, and, Figure 7 is a fragmentary longitudinal cross section taken through the upper edge of my improved socket.

When adapting a false limb to be attached to the stump of an amputated limb, it is necessary to form a stump socket to fit the stump and then adapt the socket to secure to the false limb.

In forming the socket of my invention, I first make a plaster of Paris cast or shell in the usual manner from the stump to be fitted and then from the shell, cast a duplicate form 10 of the stump. This duplicate may be formed from plaster of Paris or other suitable material which will set quickly to form an unyielding mass.

The form is then removed from the shell and a skilled workman uses a scraping tool to remove a slight amount of the body of the form from the receding areas characteristic of the fleshy portions of the stump for the purpose of reducing them in size, and also he applies additional material to the prominent areas characteristic of the boney structure of the stump.

While the workman performs this function of enlarging the prominent areas and reducing the receding areas, he must be careful to see that the peripheral size of the form does not vary any substantial amount over the original form, and certainly it must be no smaller in size.

After the duplicate form 10 of the stump is treated as outlined, it is ready for building the socket thereon. A covering 11 of soft pliable material such as glove type horse leather, is applied over the form 10 to which it conforms, and the adjoining edges 12 are feathered or skived and secured together by an adhesive 13 to form a smooth union. The inner covering 11 extends higher on the form than the finished socket is intended to be thus providing a finishing portion 11' for rolling over the upper edge of the socket as shown in Fig. 7.

An adhesive similar to that used to secure the skived edges of covering 11 is applied over the peripheral face of the covering 11, and longitudinally extending strips 14 of sponge rubber are applied to form a continuous pad 15 over the covering. The strips 14 are cut from a sheet of sponge rubber and each one is identical in thickness, but have inconstant and variable widths, as shown, to provide for variations in quantity of material necessary to encircle the uneven peripheral face of the form. A practical illustration of this being the common barrel stave which is wider at the center than the ends to provide a finished barrel which is larger about its center than its ends. The application of the pad 15 in this manner forms a socket which is shaped over the prominent areas at a slightly larger cup size than the covered area and having no inherent tension to press on the tender boney structure. The recessed areas are slightly smaller and the socket therefore bears on these areas, which are not, as a rule, tender.

A piece of firm molding leather 16 is soaked in water to make it soft and workable, and is wrapped about the resilient pad and the adjoining edges skived. After the leather covering 16 has dried and is thus properly and permanently shaped, the skived edges are secured by an adhesive.

Approximately 3 inches of the lower portion of the covering leather 16 is removed to form a shoulder 17 which rests upon the false leg and the socket is then secured thereto in the usual manner.

Having thus described my invention, I claim:

1. In making a stump socket for the stump of an amputated limb the method which comprises enlarging the prominent areas and reducing the receding areas of a duplicate form of the stump while maintaining its peripheral size, applying over the peripheral face of the form a layer of glove horse leather having its adjoining edges skived, securing the skived edges together with an adhesive to form a smooth union, applying a coat of adhesive over the face of said leather, securing multiple vertically extending strips of sponge rubber of a constant thickness and inconstant variable widths to the leather by means of said adhesive, said strips having adhesive applied to their adjoining edges to unite them into a continuous pad being free from tension, and completing the socket by applying a leather cover over the pad and securing its skived adjoining edges by means of adhesive.

2. In making a stump socket for the stump of an amputated limb the method which comprises enlarging the prominent areas and reducing the receding areas of a duplicate form of the stump while maintaining its peripheral size, applying over the peripheral face of the form a layer of smooth pliant leather and securing the adjoining ends of the leather, adhesively securing over said covering vertically extending strips of resilient padding of a constant thickness and inconstant variable widths, so that the strips contact each other at their edge portions and form a continuous pad being free from tension, and completing the socket by applying a covering of leather over the pad and securing the adjoining edges of the covering.

3. In making a stump socket for the stump of an amputated limb the method which comprises enlarging the prominent areas and reducing the receding areas of a duplicate form of the stump while maintaining its peripheral size, applying over the peripheral face of the form a continuous layer of smooth pliant covering, securing over said covering strips of resilient padding of inconstant variable widths, so that the strips contact each other at their edge portions and form a continuous pad being free from tension, and completing the socket by applying a covering over the pad and securing the adjoining edges of the covering.

4. In making a stump socket for the stump of an amputated limb the method which comprises enlarging the prominent areas and reducing the receding areas of a duplicate form of the stump while substantially maintaining its peripheral size, applying over the peripheral face of the form a continuous layer of smooth pliant covering, securing over said covering a continuous pad of resilient material being free from tension, and completing the socket by securing a covering over the pad.

References Cited in the file of this patent

UNITED STATES PATENTS

| Number | Name | Date |
| --- | --- | --- |
| 1,528,257 | Mason | Mar. 3, 1925 |
| 1,861,311 | Logan | May 31, 1932 |
| 1,907,511 | Davies | May 9, 1933 |
| 2,578,019 | Ryan | Dec. 11, 1951 |